(12) United States Patent
Becker et al.

(10) Patent No.: US 11,855,502 B2
(45) Date of Patent: Dec. 26, 2023

(54) WINDING, ROTOR AND ELECTRIC MOTOR

(71) Applicant: Bayerische Motoren Werke Aktiengesellschaft, Munich (DE)

(72) Inventors: Thomas Becker, Dorfen (DE); Andreas Jahnke, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 162 days.

(21) Appl. No.: 17/432,190

(22) PCT Filed: Mar. 3, 2020

(86) PCT No.: PCT/EP2020/055483
§ 371 (c)(1),
(2) Date: Aug. 19, 2021

(87) PCT Pub. No.: WO2020/207664
PCT Pub. Date: Oct. 15, 2020

(65) Prior Publication Data
US 2022/0190667 A1    Jun. 16, 2022

(30) Foreign Application Priority Data
Apr. 10, 2019    (DE) .............. 10 2019 109 455.0

(51) Int. Cl.
*H02K 3/32* (2006.01)
*H02K 3/30* (2006.01)

(52) U.S. Cl.
CPC ............. *H02K 3/32* (2013.01); *H02K 3/30* (2013.01)

(58) Field of Classification Search
CPC ................................. H02K 3/30; H02K 3/32

USPC ..................... 310/12.21, 12.23, 45
See application file for complete search history.

(56) References Cited

U.S. PATENT DOCUMENTS

| 9,472,987 | B1* | 10/2016 | Hall | H02K 3/12 |
| 9,800,110 | B2* | 10/2017 | Parmeter | H02K 3/30 |
| 10,115,492 | B2* | 10/2018 | Richmond | H01B 13/0036 |
| 10,923,887 | B2* | 2/2021 | Dal Re | H01F 17/045 |
| 2003/0113465 | A1 | 6/2003 | Baumann et al. | |

(Continued)

FOREIGN PATENT DOCUMENTS

| AU | 296019 B1 | 3/1966 |
| CN | 104854664 A | 8/2015 |

(Continued)

OTHER PUBLICATIONS

International Search Report (PCT/ISA/210) issued in PCT Application No. PCT/EP2020/055483 dated May 28, 2020 with English translation (five (5) pages).

(Continued)

*Primary Examiner* — Rashad H Johnson
(74) *Attorney, Agent, or Firm* — Crowell & Moring LLP

(57) ABSTRACT

A winding of at least one conductor element is provided. At least some sections of the winding are enclosed in a casting compound, and the conductor element including an internal conductive material as well as a first sheath layer and a second sheath layer for insulation purposes, the second sheath layer being made of a material that differs from a material of the first sheath layer, and the conductor element further including at least one third sheath layer, wherein the ductility of the third sheath layer is greater than the ductility of the casting compound.

11 Claims, 1 Drawing Sheet

(56) References Cited

U.S. PATENT DOCUMENTS

| | | | |
|---|---|---|---|
| 2008/0246354 A1 | 10/2008 | Asao et al. | |
| 2010/0101828 A1* | 4/2010 | Duarte Pena | C09D 179/08 |
| | | | 977/734 |
| 2013/0153261 A1 | 6/2013 | Bremser et al. | |
| 2014/0037956 A1* | 2/2014 | Sopory | H05B 3/56 |
| | | | 428/394 |
| 2015/0318099 A1 | 11/2015 | Frank et al. | |
| 2015/0325333 A1 | 11/2015 | Muto et al. | |
| 2016/0307664 A1* | 10/2016 | Obika | C09D 171/00 |
| 2018/0241271 A1* | 8/2018 | Gruebel | H02K 3/30 |
| 2018/0323685 A1 | 11/2018 | Blum et al. | |
| 2021/0163728 A1* | 6/2021 | Machinaka | H01B 11/18 |
| 2022/0190667 A1* | 6/2022 | Becker | H02K 3/30 |

FOREIGN PATENT DOCUMENTS

| | | |
|---|---|---|
| CN | 106104705 A | 11/2016 |
| CN | 107919745 A | 4/2018 |
| CN | 108352751 A | 7/2018 |
| DE | 199 63 492 A1 | 7/2001 |
| DE | 10 2005 017 113 A1 | 10/2006 |
| DE | 10 2007 048 845 A1 | 12/2008 |
| DE | 10 2010 039 168 A1 | 2/2012 |
| DE | 10 2012 218 447 A1 | 4/2014 |
| DE | 10 2014 215 107 A1 | 2/2016 |
| DE | 10 2017 200 606 A1 | 7/2018 |
| EP | 2 782 103 A1 | 9/2014 |
| EP | 3 089 170 A1 | 11/2016 |
| JP | 2004-343881 A | 12/2004 |

OTHER PUBLICATIONS

German-language Written Opinion (PCT/ISA/237) issued in PCT Application No. PCT/EP2020/055483 dated May 28, 2020 (eight (8) pages).

German-language Search Report issued in German Application No. 10 2019 109 455.0 dated Jan. 7, 2021 (10 pages).

Chinese-language Office Action issued in Chinese Application No. 202080013441.9 dated Aug. 16, 2023 with English translation (17 pages).

* cited by examiner

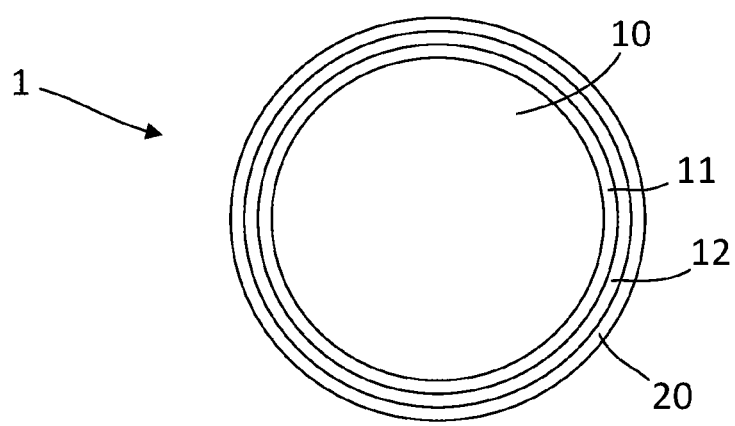

WINDING, ROTOR AND ELECTRIC MOTOR

BACKGROUND AND SUMMARY OF THE INVENTION

The present invention relates to a winding of a conductor element, to a rotor for an electric machine and to an electric machine.

Windings of the type in question are generally formed or produced from enameled wires. These are usually copper wires which are coated with an electrically insulating coating layer during manufacture. There are a wide variety of different winding techniques for the production of the windings as such, for example a rotor winding of an electric machine. The winding is often encapsulated with a suitable encapsulation composition, for example in order to increase the ability to withstand rotation speeds. In the present case, a major challenge is in particular to achieve very high packing densities or slot filling factors in order to thus increase the degrees of efficiency of the motors. For this, for example slide-optimized enameled wires are proposed, see for example DE 10 2010 039 168 A1. EP 2 782 103 A1 has the explicit aim of improving adhesion between the encapsulation composition and the enameled wires, wherein, for this purpose, an adhesive layer is provided between the insulation of the enameled wire and the encapsulation composition. Irrespective of this, it has now been shown in practice that there is additionally the problem that cracks may occur in the insulations, in particular also caused by the high rotation speeds. Said cracks may be extremely problematic for the operating behavior, particularly if they penetrate up to the wire strands.

It is therefore an object of the present invention to specify a winding, a rotor and an electric machine which are very robust in relation to crack growth or are capable of inhibiting or preventing crack propagation, for example within the encapsulation composition of a winding, to the greatest possible extent.

This object is achieved by the claimed invention.

According to embodiments of the invention, a winding of at least one conductor element is surrounded at least in certain regions by an encapsulation composition, wherein the conductor element has an internal conductor material, and wherein the conductor element has a first enveloping layer and a second enveloping layer for insulation purposes, in particular for electrical insulation, wherein the second enveloping layer is formed from a material different to a material of the first enveloping layer, and wherein the conductor element has at least a third enveloping layer, wherein the ductility of the third enveloping layer is higher than the ductility of the encapsulation composition. A multilayer design of this kind advantageously allows for a crack occurring in the encapsulation composition, in particular, to be able to be better absorbed or stopped or diverted, such that it is ensured that a sufficient insulating effect is always guaranteed. The enveloping layers are in particular insulating layers. In other words, the current-conducting conductors are always insulated or protected by a remaining layer thickness, even in the case of any cracks or the like arising in the encapsulation composition. Owing to its ductility, the third enveloping layer can advantageously prevent crack propagation or stop crack growth. According to one embodiment, the conductor element is in particular a conductor element which is round, in particular circularly round, in cross section and which is in particular composed of a metallic material, such as for example copper. Alternatively, however, the conductor element may also have other cross sections, such as for example a rectangular cross section. The materials of the first and second enveloping layers advantageously differ, in particular in terms of their structure or in terms of their composition. A material of the first enveloping layer is preferably designed so as to provide very good adhesion on or to the conductor material, while the material of the second enveloping layer, according to one embodiment, is selected or designed so as to ensure a sufficiently high temperature resistance of the conductor element. According to one embodiment, the first enveloping layer surrounds the conductor element directly or indirectly. The third enveloping layer advantageously fulfills a third function by being designed to arrest the progression of cracks or the propagation of cracks in the winding, for example proceeding from the encapsulation composition. According to one embodiment, a material of the encapsulation composition is a thermoset. A crack that may arise or has arisen there can advantageously be arrested by the ductile third enveloping layer.

According to one embodiment, the third enveloping layer has a higher ductility, elasticity and/or a higher fracture toughness than the first enveloping layer and/or the second enveloping layer and also than the encapsulation composition. The third enveloping layer may also have a higher ductility, elasticity or fracture toughness than the first or the second enveloping layer. While the first enveloping layer, according to one embodiment, surrounds the conductor material preferably directly, the third enveloping layer may be positioned differently. According to one embodiment, the third enveloping layer may alternatively be the innermost enveloping layer, that is to say that enveloping layer which surrounds or sheaths the conductor element directly.

According to a preferred embodiment, the third enveloping layer is the outermost enveloping layer of the conductor element. The first enveloping layer sheaths the conductor material expediently directly, wherein said first enveloping layer is surrounded for example directly by the second enveloping layer. The third enveloping layer advantageously forms the outermost enveloping layer. Furthermore, it is alternatively also possible for the third enveloping layer to be arranged between the first enveloping layer and the second enveloping layer, wherein the first enveloping layer forms the innermost layer. It may be necessary for the arrangement which is actually best to be determined on a case-by-case basis. In addition, it is also possible to provide several third enveloping layers.

According to one embodiment, static friction acts between the first enveloping layer and the conductor element as contact partners, said static friction being greater than the static friction of the third enveloping layer with respect to one or more adjoining contact partners. The first enveloping layer is preferably designed such that it has optimal adhesion to the conductor material or conductor core itself. By contrast, the third enveloping layer has reduced static friction and can subsequently reach the state of sliding friction "more rapidly" upon the introduction of force. This sliding action can be used to dissipate forces, which has the effect of being able to arrest a growth of cracks or a propagation of cracks from one layer to the next and in particular from the encapsulation composition in the direction of the conductor material. Generally speaking, the third enveloping layer is designed to reach the state of sliding friction more rapidly than the other enveloping layers. In particular, to this end, the static friction of said third enveloping layer with respect to the respective contact partners is configured to be lower than that of the other enveloping layers.

According to one embodiment, the enveloping layers each have a plurality of layers, wherein the first enveloping layer has more layers than the third enveloping layer. According to one embodiment, the first enveloping layer has seven layers, while the second enveloping layer has three layers and the third enveloping layer likewise has three layers. Such a proportioning may be expedient since a total thickness of the insulation cannot be increased arbitrarily. If the first enveloping layer for example in an original configuration (in the case of a conductor element with two enveloping layers) had ten layers, the number of layers can expediently be reduced to seven layers, three layers then making up the third enveloping layer.

According to one embodiment, a material of the third enveloping layer is different than a material of the second enveloping layer. A material of the second enveloping layer is preferably designed so as to achieve a specific temperature class or to provide a sufficiently high chemical resistance. Expediently, the material of the third enveloping layer is selected so as to inhibit crack propagation to the greatest possible extent. The first enveloping layer, which bears for example directly against the conductor material, preferably has very good adhesive properties with respect to said conductor material. The conductor material is advantageously copper, but alternatively also aluminum, for example.

According to one embodiment, a material of the third enveloping layer and of the first enveloping layer is a polyester (PES), in particular a THEIC-modified polyester (THEIC—tris(hydroxyethyl) isocyanurate), wherein a material of the second enveloping layer is preferably polyamide-imide (PAI).

According to one embodiment, a degree of crosslinking of the material of the third enveloping layer is lower than a degree of crosslinking of the material of the first enveloping layer. In this way, a desired ductility can be set in a targeted manner.

According to one embodiment, a temperature resistance of the second enveloping layer is higher than the temperature resistance of the other enveloping layers. A desired temperature class of the conductor element can thereby advantageously be set.

The invention is also directed to a rotor for an electric machine, comprising at least one winding according to embodiments of the invention.

The invention is also directed to an electric motor or to an electric machine, comprising a rotor according to embodiments of the invention. In particular, the electric machine is a current-excited synchronous machine, wherein the rotor has one or more windings according to embodiments of the invention. In particular, an electric motor with an extremely good ability to withstand rotation speeds can be provided as a result, said electric motor being distinguished in particular by a high operational reliability. Due to the at least one third enveloping layer of the conductor element, any cracks occurring in the winding, for example arising in the encapsulation composition, can be arrested or stopped. The current-conducting conductor itself thus always remains sufficiently insulated.

Further advantages and features emerge from the following description of one embodiment of a conductor element with reference to the attached FIGURE.

BRIEF DESCRIPTION OF THE DRAWING

FIG. 1 shows a cross section of one embodiment of a conductor element as a constituent part of a winding.

DETAILED DESCRIPTION OF THE DRAWING

FIG. 1 shows a schematic view of a conductor element 1 which has a conductor material 10 that is round or circularly round in cross section. In particular, the conductor material 10 is for example a copper wire. Said copper wire is sheathed or surrounded directly by a first enveloping layer 11. The first enveloping layer 11 is in turn sheathed or surrounded by a second enveloping layer 12. Provided as outermost layer is a third enveloping layer 20 which is in particular designed so as to inhibit crack progression within a winding, for example proceeding from the encapsulation composition (not shown here). For this purpose, the third enveloping layer 20 has in particular a correspondingly set ductility. In particular, the ductility and/or fracture toughness of the third enveloping layer 20 is greater than that of the first enveloping layer 11 and/or of the second enveloping layer 12, and in particular greater or higher than that of an encapsulation composition (not shown here) in which the conductor element 1 or the enameled wire and/or the winding are embedded. This advantageously makes it possible to ensure that the current-conducting conductor is always provided with a sufficient remaining insulation.

LIST OF REFERENCE DESIGNATIONS

1 Conductor element, enameled wire
10 Conductor material
11 First enveloping layer
12 Second enveloping layer
20 Third enveloping layer

What is claimed is:
1. A winding of at least one conductor element,
wherein the winding is surrounded at least in certain regions by an encapsulation composition,
wherein the conductor element comprises an internal conductor material,
wherein the conductor element further comprises a first enveloping layer and a second enveloping layer for insulation purposes,
wherein the second enveloping layer is formed from a material different from a material of the first enveloping layer,
wherein the conductor element further comprises at least a third enveloping layer, and
wherein a ductility of the third enveloping layer is higher than a ductility of the encapsulation composition.
2. The winding according to claim 1,
wherein the third enveloping layer has at least one of a higher ductility or a higher fracture toughness than at least one of the first enveloping layer or the second enveloping layer.
3. The winding according to claim 1,
wherein the third enveloping layer is an outermost enveloping layer.
4. The winding according to claim 1,
wherein static friction acts between the first enveloping layer and the conductor element as contact partners, the static friction being greater than a static friction of the third enveloping layer with respect to at least one adjoining contact partner.
5. The winding according to claim 1,
wherein each of the enveloping layers comprises a multiplicity of layers, and
wherein the first enveloping layer comprises more layers than the third enveloping layer.

6. The winding according to claim 1,
wherein a material of the third enveloping layer is different than a material of the second enveloping layer.

7. The winding according to claim 1,
wherein a material of the third enveloping layer and a material of the first enveloping layer are a polyester (PES), and
wherein a material of the second enveloping layer is polyamide-imide (PAI).

8. The winding according to claim 1,
wherein a degree of crosslinking of a material of the third enveloping layer is lower than a degree of crosslinking of the material of the first enveloping layer.

9. The winding according to claim 1,
wherein a temperature resistance of the second enveloping layer is higher than a temperature resistance of the first enveloping layer and the third enveloping layer.

10. A rotor comprising the winding according to claim 1.

11. An electric motor comprising the rotor according to claim 10.

\* \* \* \* \*